Nov. 4, 1969  M. H. FRANK  3,475,982
BELT-TYPE DRIVE WITH ADJUSTABLE PULLEY TENSIONER
Filed May 9, 1968  3 Sheets-Sheet 1

INVENTOR.
Mark H. Frank
BY
Robert J. Outland
ATTORNEY

INVENTOR.
Mark H. Frank
BY
Robert J. Outland
ATTORNEY

Nov. 4, 1969  M. H. FRANK  3,475,982

BELT-TYPE DRIVE WITH ADJUSTABLE PULLEY TENSIONER

Filed May 9, 1968  3 Sheets-Sheet 3

INVENTOR.
Mark H. Frank
BY
Robert J. Outland
ATTORNEY

United States Patent Office 3,475,982
Patented Nov. 4, 1969

3,475,982
BELT-TYPE DRIVE WITH ADJUSTABLE
PULLEY TENSIONER
Mark H. Frank, Rochester, Mich., assignor to General
Motors Corporation, Detroit, Mich., a corporation of
Delaware
Filed May 9, 1968, Ser. No. 727,970
Int. Cl. F16h 7/16
U.S. Cl. 74—242.15                    7 Claims

ABSTRACT OF THE DISCLOSURE

A camshaft drive arrangement for an engine including, in a preferred embodiment, a crankshaft driven belt engaging a driven pulley adjustably mounted on the engine rocker cover and drivably connected with the engine camshaft through a universally mounted drive shaft. The arrangement permits adjustment of the driven pulley without movement of the camshaft for the purpose of properly adjusting tightness of the driving belt.

FIELD OF THE INVENTION

This invention relates to belt-like drives such as belt and chain drives and the like and more particularly to a camshaft drive for an internal combustion engine having means to adjust the tightness of the belt or chain drive means.

DESCRIPTION OF THE PRIOR ART

In the prior art relating to belt-like drives, many devices are shown for adjusting the tension or slack of a driving belt or chain used to connect two or more pulleys or sprockets. Such devices include adjustable pulleys or snubbing devices which engage the belt-like drive means between the drive and driven pulleys to take up slack as desired. Many of these devices utilize a belt engaging means serving no other purpose than the tension adjustment. Others may utilize an accessory drive pulley or sprocket which is arranged for adjustment with respect to the drive and driven pulleys.

SUMMARY OF THE INVENTION

The present invention proposes a different form of tensioning or slack adjusting means for belt-like drives. In this arrangement one of the drive or driven pulleys or sprockets is adjustably mounted with respect to the other and universal drive means are provided between the adjustable pulley and the drive or driven member to which it is connected. In this way, adjustment of the tightness of the belt or other belt-like means may be accomplished within the limits of movement permitted by the universal drive means merely by adjusting the position of the movable pulley.

In a preferred form the invention provides a camshaft drive for an internal combustion engine in which the camshaft is connected by a universal drive shaft to an adjustably mounted driven pulley. The driven pulley is connected by a cog belt to a drive pulley mounted on the engine crankshaft. Tension of the cog belt is adjusted as desired by movement of the driven pulley mounting means which moves the rotational center of the pulley as necessary. This action is permitted due to the connection of the pulley with the camshaft through the universally mounted drive shaft.

Further advantages of the invention will be apparent from the following detailed description of two alternative embodiments of the invention as applied to an engine overhead camshaft drive.

DESCRIPTION OF THE PREFERRED
EMBODIMENTS

Figure 1:
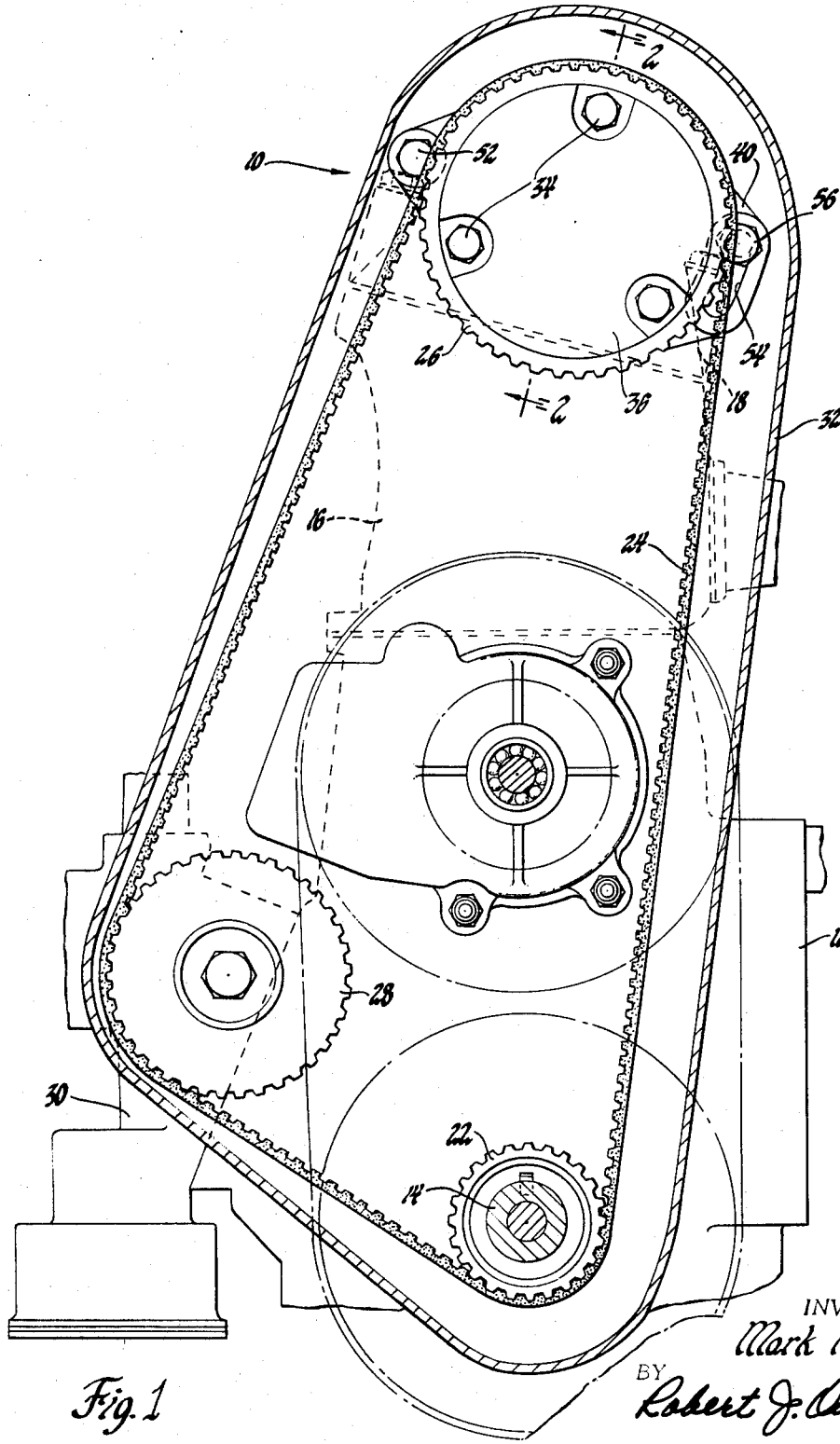
FIGURE 1 is a front elevation view of an overhead camshaft engine having cog belt camshaft drive means according to the invention.

Referring now to the drawings in detail, FIGURE 1 illustrates an in-line internal combustion engine generally indicated by numeral 10 and having a cylinder block 12 rotatably journaling a crankshaft 14. Cylinder block 12 includes a plurality of aligned cylinders (not shown) in which are arranged pistons connected with the crankshaft 14 in the usual manner. A cylinder head 16 is supported on cylinder block 12, closing the upper ends of the cylinders. A rocker cover 18 is mounted on the cylinder head and rotatably journals a camshaft 20 for actuating valve gear mounted in the cylinder head. Cylinder block 12, cylinder head 16 and rocker cover 18 are assembled together to form a closed housing for the majority of engine moving parts.

On the front of the crankshaft 14, a toothed drive pulley 22 is secured. Pulley 22 engages a toothed belt 24 which, in turn, engages a driven pulley 26 for driving the camshaft. The belt also engages a driven pulley 28 which connects with and drives accessories located in an accessory housing 30 mounted on one side of the cylinder block 12. The belt and the various pulleys are located forward of the engine housings 12, 16, 18 and are enclosed by a cover 32.

Figures 2, 3, 4:
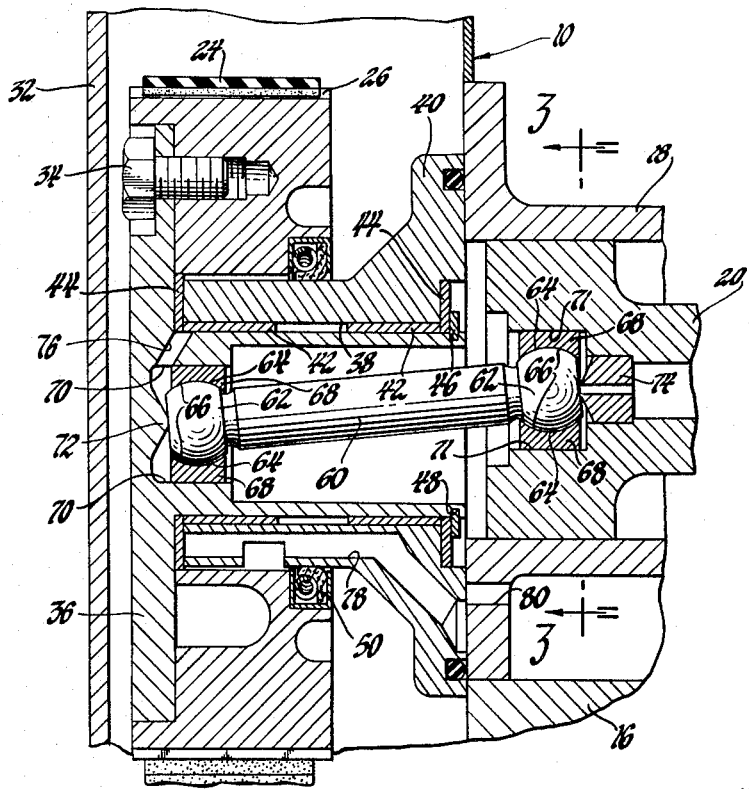
FIGURE 2 is a fragmentary cross-sectional view taken along the plane indicated by the line 2—2 of FIGURE 1 and showing one embodiment of an adjustable pulley and universal drive shaft connection to the engine camshaft.
FIGURE 3 is a cross-sectional view taken in the plane indicated by the line 3—3 of FIGURE 2.
FIGURE 4 is a pictorial view showing the universal drive shaft and driving shoes of the embodiment of FIGURES 2 and 3.

As best shown in FIGURE 2, driven pulley 26 is secured by bolts 34 to a flange member 36 which extends into the bore 38 of a support member 40. Member 36 is rotatably journaled within support 40 on journal bearings 42 and is positioned by thrust bearings 44, one of which is retained by a snap ring 46 engaging a groove 48 of member 36. A lubricant seal 50 seals the clearance between pulley 26 and the outer surface of support 40.

Support member 40 is, in turn, retained on rocker cover 18 by a bolt 52 on which it is pivotably movable within the limits permitted by a slotted opening 54 into which extends a locking bolt 56. The support 40 is locked in its properly adjusted position by tightening bolt 56 so as to engage the support adjacent the slotted opening.

Member 36 is connected with camshaft 20 by universal driving means comprising a drive shaft 60 having formed end portions 62 with cylindrical drive surfaces 64. These are pivotably received in mating surfaces 66 of driving shoes 68. Shoes 68, in turn, engage and pivot on opposed flat surfaces 70 and 71 formed internally of the member 36 and camshaft 20, respectively, to provide for universal pivotal movement of the drive shaft in both member 36 and camshaft 20. A formed protrusion 72 in member 36 and an orificed plug 74 in camshaft 20 engage the ends of and position drive shaft 60 to avoid its binding during pivotal movement.

Lubricating oil is supplied to the mechanism through the hollow centers of camshaft 20 and plug 74 and past the pivotally mounted ends of drive shaft 60 to a radially directed passage 76 in member 36 from whence it is directed to bearings 42 and 44. From the bearings, oil passes to a drain passage 78 in support 40 which connects with an opening 80 in rocker cover 18, returning therethrough to the engine sump.

In operation, drive pulley 22 is driven by the camshaft and drives belt 24 which, in turn, drives pulleys 26 and 28. Pulley 26 connects through member 36 to drive drive shaft 60 which, in turn drives the camshaft 20. The universal mounting of shaft 60 permits camshaft 20 and pulley 26 to rotate on spaced parallel axes. Adjustment of the belt tension may be made by loosening bolt 56 and pivoting support 40 around bolt 52 to the desired position. Because of the universal mounting of drive shaft 60, the driving relationship between pulley 26 and camshaft 20 is unchanged by this adjustment.

Figure 5:
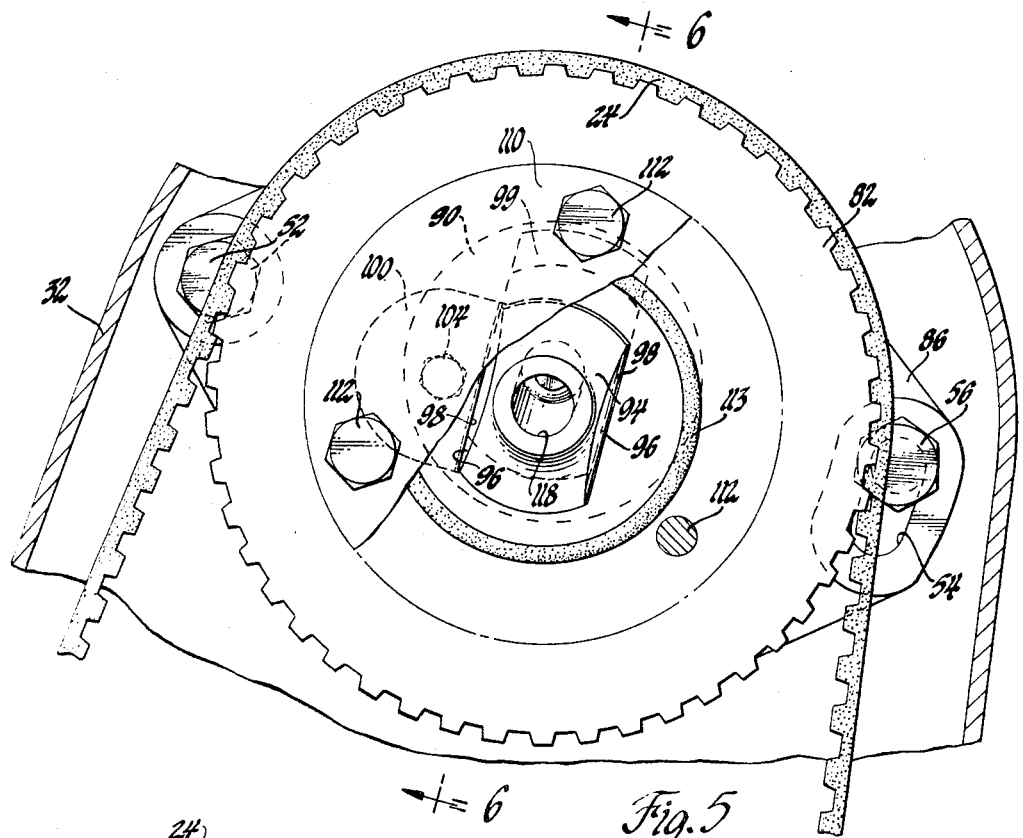
FIGURE 5 is a fragmentary end elevation partially in section showing an alternative embodiment of an adjustable pulley and universal drive shaft connection and
FIGURE 6 is a cross-sectional view taken along the plane indicated by the line 6—6 of FIGURE 5.
Figure 6:
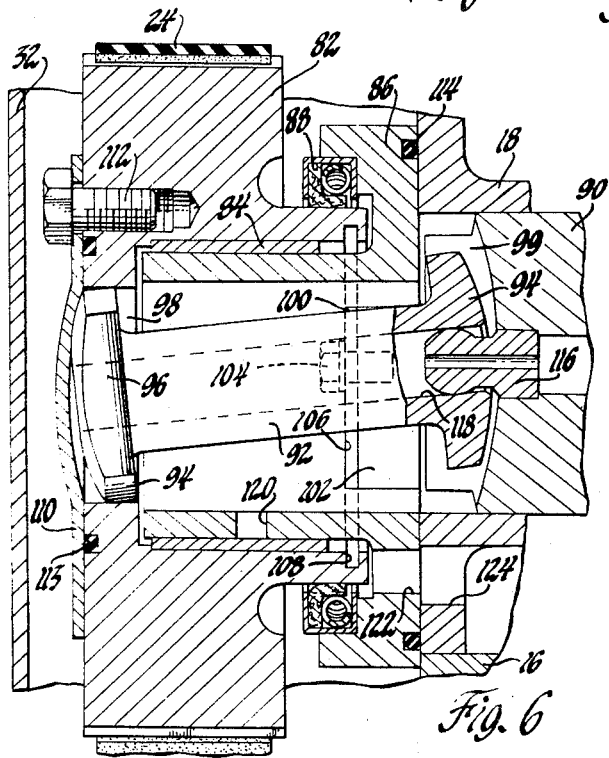

FIGURES 5 and 6 illustrate an alternative embodiment of the adjustable pulley and camshaft drive arrangement. Elements common to both embodiments are identified by like numerals in the figures.

In the embodiment of FIGURES 5 and 6, the toothed belt 24 engages a driven pulley 82 which is rotatably journaled by a bearing 84 on an adjustable support member 86. The clearance between the pulley 82 and support 86 is closed by a seal 88. Pulley 82 is connected with the engine camshaft 90 by a drive shaft 92 having end portions 94 with cylindrically formed drive surfaces 96. Surfaces 96 engage opposed flat surfaces 98 and 99 formed in the pulley and camshaft, respectively, so as to drivingly connect pulley 82 with the camshaft 90.

Pulley 82 is retained on the support by a D-shaped key 100 which is secured to a boss 102 of the support by a bolt 104. The key 100 extends through an opening 106 of the support into a groove 108 formed in the inner surface of pulley 82. A cover 110 is retained on the outer end of pulley 82 by bolts 112 and has a seal 113 to prevent the escape of lubricant therefrom. A seal 114 performs a similar function for the mounting surface between support 86 and the rocker cover 18.

Lubricant is supplied to the moving parts through the hollow center of camshaft 90 and the orificed center of a guide plug 116, which is carried in the end of camshaft 90 and locates one end of a central passage 118 extending through drive shaft 92. From passage 118, lubricant enters the interior of support 86 and passes through an opening 120 or through clearance space between the pulley 82 and support 86 so as to lubricate bearing 84. Lubricant escaping from the bearing passes through an opening 122 in the support 86 and an opening 124 in the rocker cover 18 from whence it is returned to the sump.

Operation and adjustment of the alternative embodiment are accomplished in the same manner as previously described for the embodiment of FIGURES 1 through 4.

It is apparent that the universal drive and belt tightening arrangements disclosed are merely illustrative of the broader forms of the invention which may be applied to chain or other similar drive means as used in internal combustion engines or other mechanisms where a chain-like drive between rotatable members is utilized.

I claim:
1. Adjustable belt-type drive means comprising
   a member rotatable on an axis,
   a first pulley axially spaced from said member and rotatable on an axis generally parallel with said member axis and laterally movable with respect thereto,
   universal drive means connecting said member and said first pulley,
   a second pulley laterally spaced from said first pulley and
   belt-like drive means engaging and drivably connecting said pulleys,
   whereby said second pulley is drivably connected with said member and lateral movement of said first pulley adjusts the tightness of said belt-like drive means.

2. Belt-type drive means as defined in claim 1 wherein said universal drive means comprise a shaft having universally pivotable end portions drivingly connecting said member and said first pulley.

3. Camshaft drive for a combustion engine of the type having a housing journaling a crankshaft and a camshaft rotatable on parallel axes, said camshaft drive comprising
   a pulley support mounted on said housing adjacent one end of said camshaft,
   a driven pulley rotatably carried on said support,
   universal drive means connecting said camshaft with said driven pulley,
   a drive pulley spaced from said driven pulley, said drive pulley being rotatably carried on said housing and drivably connected with said crankshaft and
   belt-like drive means engaging and drivably connecting the peripheries of said drive and driven pulleys,
   said pulley support being arranged for adjusting movement on said support generally toward and away from said drive pulley and transverse to said camshaft axis to properly adjust the tightness of said belt-like means.

4. The camshaft drive of claim 3 wherein said universal drive means comprising a shaft member having end portions universally pivotably connected with said driven pulley and said camshaft so as to rotatably connect said driven pulley and said camshaft in all adjustment positions of said pulley support.

5. The camshaft drive of claim 4 wherein said pulley support is pivotably mounted on said engine housing for movement around securing means on one side of said support and other securing means on another side of said support are actuable to secure said support in any of a plurality of pivotally adjusted positions.

6. The camshaft drive of claim 4 and further including lubricant passage means in said support and arranged to receive lubricant delivered from passage means in said camshaft to lubricate said universal drive means and said driven pulley and to return said lubricant to drain means in the engine housing.

7. The combination of claim 4 wherein said support member rotatably journals a flanged member within a bore of said support and said driven pulley is secured to said flanged member for rotation therewith, said universal drive means engaging said flanged member to connect said driven pulley with said camshaft.

References Cited
UNITED STATES PATENTS

| | | | |
|---|---|---|---|
| 1,348,002 | 7/1920 | Harroun | 74—242.15 |
| 2,537,120 | 1/1951 | Collis. | |
| 3,361,000 | 1/1968 | Buchwald. | |

FRED C. MATTERN, Jr., Primary Examiner

J. A. WONG, Assistant Examiner